(12) United States Patent
Ortega Estornel et al.

(10) Patent No.: US 11,981,072 B2
(45) Date of Patent: May 14, 2024

(54) CARRIAGE ASSEMBLY FOR AN ADDITIVE MANUFACTURING SYSTEM

(71) Applicant: HEWLETT-PACKARD DEVELOPMENT COMPANY, L.P., Spring, TX (US)

(72) Inventors: Luis Angel Ortega Estornel, Sant Cugat del Valles (ES); Pedro Garcia Garces, Sant Cugat del Valles (ES); Vicente Granados Asensio, Sant Cugat del Valles (ES)

(73) Assignee: Hewlett-Packard Development Company, L.P, Spring, TX (US)

( * ) Notice: Subject to any disclaimer, the term of this patent is extended or adjusted under 35 U.S.C. 154(b) by 0 days.

(21) Appl. No.: 16/608,254

(22) PCT Filed: Jan. 23, 2018

(86) PCT No.: PCT/US2018/014793
§ 371 (c)(1),
(2) Date: Oct. 25, 2019

(87) PCT Pub. No.: WO2019/147218
PCT Pub. Date: Aug. 1, 2019

(65) Prior Publication Data
US 2021/0283836 A1    Sep. 16, 2021

(51) Int. Cl.
*B29C 64/165*   (2017.01)
*B29C 64/209*   (2017.01)
(Continued)

(52) U.S. Cl.
CPC .......... *B29C 64/165* (2017.08); *B29C 64/209* (2017.08); *B29C 64/236* (2017.08);
(Continued)

(58) Field of Classification Search
USPC ......................................... 264/405
See application file for complete search history.

(56) References Cited

U.S. PATENT DOCUMENTS 5,393,482 A * 2/1995 Benda .................... B33Y 40/00
419/61
2007/0241482 A1   10/2007 Giller et al.
(Continued)

FOREIGN PATENT DOCUMENTS

WO     WO2016030405 A1    3/2016

*Primary Examiner* — S. Behrooz Ghorishi
*Assistant Examiner* — Gregory C. Grosso
(74) *Attorney, Agent, or Firm* — Shook, Hardy & Bacon L.L.P.

(57) ABSTRACT

Certain examples described herein relate to a carriage assembly for an additive manufacturing system. The carriage assembly comprises a movable carriage to move over a build zone of the additive manufacturing system, a thermal sensor device on the carriage to obtain thermal data associated with a region of build material in the build zone, radiation device on the carriage to apply radiation onto the build material. The radiation device is configurable between a preheating mode, to apply radiation onto the region of build material to raise a surface temperature thereof, and a fusing mode, to apply radiation onto the region of build material to selectively fuse at least part of the region of build material.

17 Claims, 3 Drawing Sheets

(51) Int. Cl.
  *B29C 64/236*   (2017.01)
  *B29C 64/277*   (2017.01)
  *B29C 64/314*   (2017.01)
  *B29C 64/393*   (2017.01)
  *B33Y 10/00*    (2015.01)
  *B33Y 30/00*    (2015.01)
  *B33Y 40/10*    (2020.01)
  *B33Y 50/02*    (2015.01)

(52) U.S. Cl.
  CPC .......... *B29C 64/277* (2017.08); *B29C 64/314* (2017.08); *B29C 64/393* (2017.08); *B33Y 10/00* (2014.12); *B33Y 30/00* (2014.12); *B33Y 40/10* (2020.01); *B33Y 50/02* (2014.12)

(56) References Cited

U.S. PATENT DOCUMENTS

| | | |
|---|---|---|
| 2014/0314613 A1 | 10/2014 | Hopkinson et al. |
| 2015/0165525 A1 | 6/2015 | Jonasson |
| 2016/0375491 A1 | 12/2016 | Swaminathan et al. |
| 2017/0021455 A1 | 1/2017 | Dallarosa et al. |
| 2017/0072463 A1* | 3/2017 | Ng .................. B29C 64/264 |
| 2017/0203363 A1 | 7/2017 | Rowland et al. |

\* cited by examiner

CARRIAGE ASSEMBLY FOR AN ADDITIVE MANUFACTURING SYSTEM

BACKGROUND

Apparatus that generate three-dimensional objects, including those commonly referred to as "3D printers", can be used to produce three-dimensional objects. These apparatus typically receive a definition of the three-dimensional object in the form of an object model. This object model is processed to instruct the apparatus to produce the object, for example, using a particulate material. The object may be produced on a layer-by-layer basis.

BRIEF DESCRIPTION OF THE DRAWINGS

Various features of the present disclosure will be apparent from the detailed description which follows, taken in conjunction with the accompanying drawings, which together illustrate, by way of example, features of the present disclosure, and wherein.

DETAILED DESCRIPTION

Figure 1A:
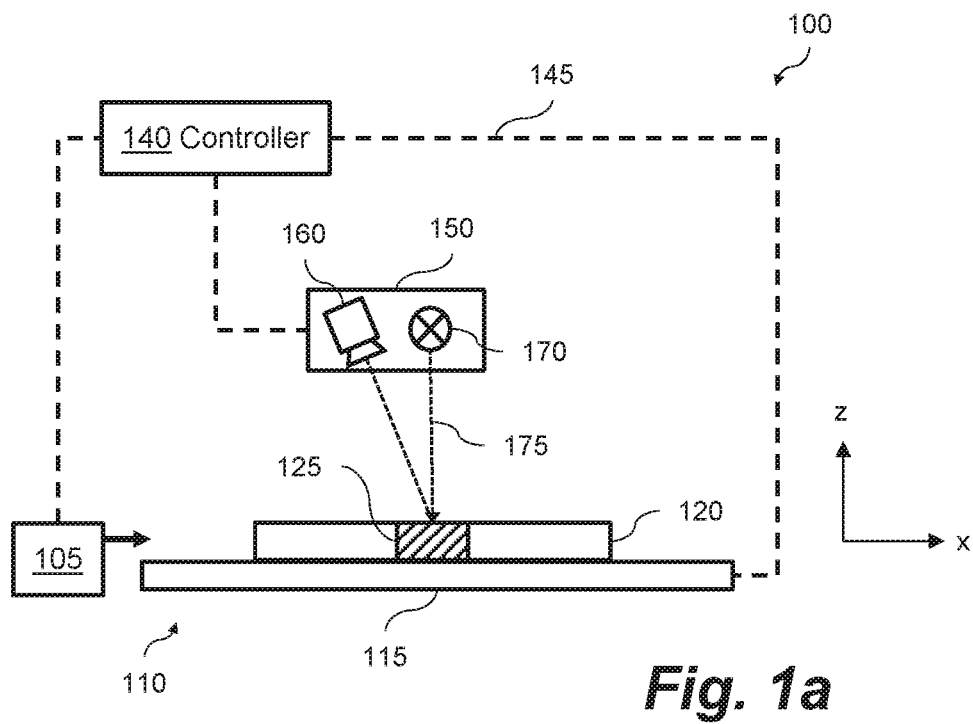
FIGS. 1a and 1b are schematic diagrams of an apparatus for generating a three-dimensional object, according to examples.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Additive manufacturing systems, otherwise referred to as "3D printing systems", may produce three-dimensional (3D) objects by solidifying successive layers of a build material. The build material may be in the form of a powder bed comprising, for example, plastic, metallic, or ceramic particles. In additive manufacturing systems, objects may be fabricated based on object data which may be, for example a 3D model of an object generated using a CAD computer program. The model data is processed into slices, each slice defining a portion of a layer of build material to be solidified.

Chemical agents, referred to herein as "printing agents", may be selectively deposited onto a layer of build material. Examples of printing agents include fusing agents, detailing agents and binding agents.

A fusing agent (sometimes also referred to as a "coalescing agent") may increase heating of the build material by acting as an energy absorbing agent that can cause build material on which it has been deposited to absorb more energy (e.g. from a radiation source) than build material on which no agent has been deposited. This may cause a defined portion of build material to heat up when energy is applied to the layer of build material. When preheating the region of build material, a desired temperature for the region may be below a melting or fusing temperature of the build material. Application of fusing agent to the region may cause, during a subsequent application of energy to irradiate the region of build material, localized heating of the region of build material to a temperature above the melting or fusing temperature. This can cause the region of build material to melt, coalesce or fuse, and then solidify after cooling. In this manner, solid parts of the object may be constructed.

According to one example, a suitable fusing agent may be an ink-type formulation comprising carbon black, such as, for example, the ink formulation commercially known as CM997A available from Hewlett-Packard Company. In one example such an ink may additionally comprise an infra-red light absorber. In one example such an ink may additionally comprise a near infra-red light absorber. In one example such an ink may additionally comprise a visible light absorber. In one example such an ink may additionally comprise a UV light absorber. Examples of inks comprising visible light enhancers are dye based colored ink and pigment based colored ink, such as inks commercially known as CE039A and CE042A available from Hewlett-Packard Company.

A detailing agent (sometimes also referred to as a "modifying agent") may act to modify the effect of a fusing agent and/or act directly to cool build material. When heating the region of build material, a detailing agent may thus be applied, for example, to reduce a heating effect of previously applied fusing agent and/or to directly reduce the temperature of the build material. When constructing a 3D object, a detailing agent may be used to form sharp object edges by inhibiting a fusing outside of an object boundary and thus preventing solidification in exterior areas of a cross-section. During construction of an object, a detailing agent may also be used to prevent thermal bleed from a fused area to a non-fused area and to prevent fusing in certain "blank" or "empty" portions of an object (e.g. internal cavities). At the end of production of an object, unfused build material may be removed to reveal the completed object.

In examples, a fusing agent may be selectively applied to a layer in areas where particles of the build material are to fuse together, and a detailing agent may be selectively applied where the fusing action is to be reduced. In some examples, a fusing agent is used but a detailing agent is not used. In some examples, the printing agents may comprise colorants and may be deposited on a white powder to color the powder. In other examples, objects may be constructed from layers of fused colored powder.

A binding agent (sometimes also referred to as a "binder") may act to cause build material on which it has been deposited to solidify via binding. A binding agent is different from a fusing agent in that a fusing agent acts as an energy absorbing agent that causes build material on which it has been deposited to absorb more energy than the build material would absorb in the absence of the fusing agent. A binding material or binder, on the other hand, chemically acts to draw build material together to form a cohesive whole. For example, application of energy, using an energy or radiation source, may activate the binding agent to bind portions of the build material.

For a given layer of build material to be solidified, energy may be applied during at least two different stages of the build process. Firstly, the layer of build material may be preheated. "Preheating" in this context refers to heating the build material before energy is subsequently applied to fuse the build material on which fusing agent has been applied. During preheating, the build material may be heated to a temperature that is below the melting point or fusing point for the build material. The fusing point for the build material may be a temperature value at which particulates of the build material begin to fuse to one another. One or more of the printing agents described above may then be deposited onto the preheated build material. Following the deposition of the printing agents, energy is applied to irradiate the printing agents, causing localized heating to a temperature above the melting point or fusing point of the build material, resulting in fusing of the build material.

When applying energy to a layer of build material, it is noted that the amount of energy to fuse a given region of the layer may depend on a temperature of the given region: the closer the temperature of the given region of build material is to the fusing temperature for the build material, the less energy, and vice versa.

In certain additive manufacturing systems, energy is applied to a build material layer to preheat the build material layer to a target temperature. Some systems do this using an array of fixed radiation sources, such as shortwave infrared lamps, positioned above the build material layer. In certain cases, the energy that is applied by the array of radiation sources may be modulated based on the temperature of the whole layer of build material as measured by a thermal camera positioned above the array of fixed radiation sources.

However, the spatial resolution of the radiation applied to the build material layer may depend on the spatial resolution of the radiation sources in the array, e.g. on a given number of radiation sources in a given area. Thus, as the size of the build zone of a 3D printing system is scaled up to provide the ability to print larger 3D objects, there may be a need to increase the number of such fixed shortwave IR emitters. Such statically fixed shortwave IR emitters are costly, and so increasing the number used can thereby significantly increase the overall cost of large 3D printing systems. The power consumption of 3D printing systems may also increase due to the increase in the number of short wave IR emitters used.

Figure 1B:
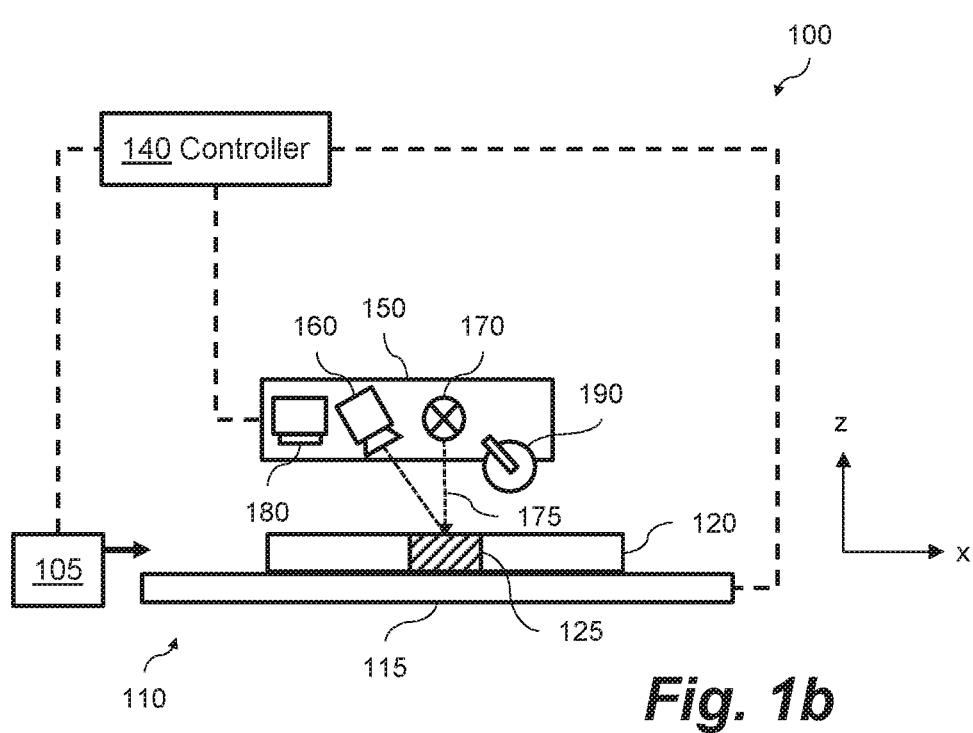

FIGS. 1a and 1b show schematic side views of respective examples of an apparatus 100 for generating a three-dimensional object. The apparatus 100 may comprise or form part of an additive manufacturing machine, e.g. a three-dimensional printing system, or "3D printer". Certain examples described herein may be implemented within the context of this additive manufacturing machine.

In the example of FIGS. 1a and 1b, the apparatus 100 includes a moveable carriage 150 to move over a working area 110 containing build material 120. The working area 110, or "build zone", is to receive a layer of the build material 120. For example, the build material 120 may be deposited in the build area 110. The build material 120 may be a particulate material. The particulate material may comprise, for example, plastic, metallic, or ceramic particles. The particulate material 120 may comprise a powder-based or powder-like material. For example, the build material 120 comprises a powdered substrate in the examples of FIGS. 1a and 1b. As used herein the term "powder-based material" is intended to encompass both dry and wet powder-based materials, particulate materials, and granular materials. It should be understood, however, that the examples described herein are not limited to powder-based materials or to any of the materials listed above. In other examples the build material may be a paste or a gel. According to one example a suitable build material 120 may be a powdered semi-crystalline thermoplastic material. In other examples, the build material 120 may be formed from, or may comprise, short fibers that may, for example, have been cut into short lengths from long strands or threads of material.

In this example, the working area 110 includes a build platform 115 arranged to hold the layer of build material 120. In some examples, the working area 110, build material 120 and/or build platform 125 are separate from the additive manufacturing apparatus 100 and are only present in use.

The build material 120 may be deposited within the build area 110 by a substrate supply mechanism 105. The supply mechanism 105 may comprise a material hopper. The supply mechanism 105 may be configured to supply at least one layer of build material 120. In some examples, the substrate supply mechanism 105 is separate and removable from the apparatus 100, and may only be present in use.

In the examples of FIGS. 1a and 1b, the moveable carriage 150 is moveable relative to the build material 120. The moveable carriage 150 may be configured to move in one, two or three dimensions over the build material 120. For example, the moveable carriage 150 may be configured to move horizontally along an x-axis direction indicated in FIGS. 1a and 1b and/or along a y-axis direction, e.g. perpendicularly to the plane x-z plane of FIGS. 1a and 1b. In some examples, the moveable carriage 150 may move vertically in the z-axis direction indicated in FIGS. 1a and 1b. In another case, the build platform 125 and material 120 may be moveable underneath a static carriage 140. Various combinations of approaches are possible. The carriage may include thereon various components to perform functions during an additive manufacturing process, as described in examples below.

In the examples of FIGS. 1a and 1b, the apparatus 100 further comprises a controller 140. The controller 140 can control various components of the apparatus 100. The controller 140 may comprise one or more processors for example. The processor(s) may, for example, be one or more of a microprocessor, a microcontroller, a programmable gate array, an application specific integrated circuit (ASIC), a computer processor, or the like. The processor(s) may, for example, include multiple cores on a chip, multiple cores across multiple chips, multiple cores across multiple devices, or combinations thereof. In some examples, the processor(s) may include at least one integrated circuit (IC), other control logic, other electronic circuits, or combinations thereof.

The controller 140 may further comprise computer readable storage medium, e.g. memory, configured to store, encode, or carry instructions that, when executed, cause the processor(s) to implement one or more methods. For example, the controller may control the supply mechanism 105, movement of the platform 110, and the moveable carriage 150, including one or more components situated thereon.

The computer readable storage medium may include a single medium or multiple media. For example, the computer readable storage medium may include one or both of a memory of the ASIC, and a separate memory in the controller 140. The computer readable storage medium may be any electronic, magnetic, optical, or other physical storage device. For example, the computer-readable storage medium may be, a random access memory (RAM), a static memory, a read-only memory (ROM), an electrically erasable programmable read-only memory (EEPROM), a hard drive, an optical drive, a storage drive, a CD, a DVD, and the like. The computer-readable storage medium may be non-transitory. The processor may be in communication with the computer readable storage medium via a communication bus.

The controller 140 may be connected directly or indirectly to the various components of the apparatus 100 via one or more communication paths 145, shown depicted as dashed lines in FIGS. 1a and 1b. In some examples, the various components each have their own controller which may operate independently of each other, or in cooperation.

In the examples shown in FIGS. 1a and 1b, the moveable carriage 150 includes, e.g. is equipped with, a thermal sensor device 160 and a radiation device 170.

The thermal sensor device 160 may be a point contactless thermal sensor, such as a thermocouple or a thermopile. In examples, the thermal sensor device 160 is a thermal imaging, or "thermographic", camera. The thermal sensor device 160 may be to measure a temperature value of, or capture an image representing a radiation distribution emitted by an imaged area, e.g. of build material 120. For example, the measured temperature value may be an average temperature over the imaged area of build material 120. Similarly, the captured thermal image data obtained by the thermal imaging camera may span the imaged area of build material 120.

The radiation device 170 may comprise a lamp, for example a short-wave incandescent or infra-red (IR) lamp. In other examples, the radiation device 170 may be another light source constructed to emit electro-magnetic radiation across a range of wavelengths to heat the build material 120. For example, the radiation device 170 may be a lamp that can emit electro-magnetic radiation in the near-IR, UV, or visible spectra. In other examples, the radiation device 170 may comprise IR, near-IR, UV, or visible light emitting diodes (LED), or one or more lasers with a specific wavelength. In some cases, the radiation device 170 may be a halogen lamp. In certain cases, the radiation device 170 may be a heat lamp comprising xenon, e.g. a xenon lamp.

In the examples of FIGS. 1a and 1b, the thermal sensor device 160 on the carriage 150 is a thermal imaging camera 160 to obtain thermal image data associated with a region 125 of the build material 120. The thermal image data may for example comprise a two-dimensional representation of the temperature of the upper surface of the region 125 of build material as a function of position. For example, the two-dimensional representation may be expressed as a temperature T (e.g. in Celsius) at associated Cartesian x-y coordinates (e.g. in micrometers). This two-dimensional representation may comprise an array or a "thermal image" of the upper surface of the region 125 of build material. Values within the array, or pixels within the image, may be representative of the measured temperature at a given spatial point in the x-y plane of the region 125 of build material.

The radiation device 170 on the carriage 150 is to emit radiation onto the build material. The radiation device 170 has a preheating mode and a fusing mode. For example, in the preheating mode the radiation device 170 may heat the build material 120 before energy is subsequently applied in the fusing mode to fuse the build material 120, e.g. at a later time in the build process. During preheating, e.g when the radiation device 170 is in the preheating mode, the build material 120 may be heated by the radiation device 170 to a temperature that is below the melting point or the fusing point for the build material 120. As the radiation device 170 is closer to the build material 120 during preheating, compared to systems that employ a static array of heat sources above the build material and other printer components, a higher heating efficiency may be reached compared to other systems. For example, in systems that implement short wave IR emitters statically in an overhead configuration, which may be relatively far from the build material surface due to clearance requirements for the printing station (e.g. comprising printing agent depositors) and a separate radiation source for fusing the build material (e.g. a fusing lamp), the IR radiation emitted can dissipate when travelling through the relatively large air gap separating the shortwave IR emitters and the build material surface. This can lower the heating efficiency of the 3D printing system.

Thus, in the present apparatus 100 where the application of radiation during the preheating and fusing stages is performed by the same radiation device 170, there may be a lower amount of power attenuation, and therefore a higher heating efficiency, compared to systems where at least the preheating radiation device is further away, which means at least the preheating radiation has a longer path length to the build material 120.

In the fusing mode, the radiation device 170 may apply energy to cause localized heating to a temperature above the melting point or fusing point of the build material 120, resulting in fusing of the build material 120. Printing agents may be deposited onto preheated build material 120 prior to fusing, e.g. following preheating. For example, following deposition of the printing agents, the radiation device 170 may, in the fusing mode, apply energy to irradiate the deposited printing agents to cause the localized heating to a temperature above the melting point or fusing point of the build material 120.

In the examples of FIGS. 1a and 1b, the controller 140 is to receive build instructions. Based on the build instructions, the controller 140 is to position the moveable carriage 150 relative to the working area 110, and set the mode of the radiation device 170. For example, the build instructions obtained by the controller 140 may comprise, or be generated based on, data representative of a layer of a 3D object to be fabricated by the apparatus 100, e.g. object design data. The data representative of a layer, or "slice", of the 3D object may be generated from object design data representing a 3D model of the object to be generated, and/or from object design data representing properties of the object. The model may define the portions of the object to be solidified, and may be processed by the three-dimensional object processing system to generate slices of parallel planes of the model. Each slice may define a portion of a respective layer of build material that is to be solidified by the additive manufacturing apparatus 100. The object property data may define properties of the object such as density, surface roughness, strength, and the like. The object design data and object property data may be received, for example, as input from a user via an input device, from a software driver, from a software application such as a computer aided design (CAD) application, or may be obtained from a memory storing default or user-defined object design data and object property data.

The controller 140 is to also receive the thermal image data, associated with the region 125 of the build material 120, from the thermal imaging camera 160. The controller 140 is to control, based on the thermal image data and the mode of the radiation device 170 (e.g. whether the radiation device 170 is in the preheating mode or the fusing mode) an amount of radiation energy applied to the region 125 of the build material 120 by the radiation device 170.

Such controlling of the amount of radiation energy to be applied to a region of a build material layer according to the temperature of the region may allow a reduction in unwanted defects that can arise due to under- or over-heating certain areas of the build material layer. For example, in certain additive manufacturing systems, a constant amount of energy is applied to the whole build material layer to fuse specific portions thereof. The portions of build material to be fused may have a fusing agent applied thereto following preheating, as described above, such that when the constant amount of energy is subsequently applied, those portions are heated to above the fusing temperature for the build material due to the fusing agent absorbing energy and heating up. The constant amount of energy may be calibrated before the build process such that the amount of energy applied to the preheated build material layer causes fusing in portions of the build material with fusing agent applied, but not in portions of the build material without fusing agent applied. However, defects may occur in fabricated objects where the spatial resolution of the applied energy during the building process is insufficient. For example, in areas of the build material where the applied energy is too low, e.g. causing heating of the build material to a temperature too far below the fusing temperature, the borderline surface of the fabricated object may be unevenly distributed, e.g. with lines or cracks apparent thereon: an effect which may be referred to as "elephant skin". In the converse situation, where an area subjected to an applied energy that is too high, e.g. causing heating of the build material to a temperature too high above the fusing temperature, additional build material may be attached to the edges of the fabricated object.

Thus, by controlling the amount of radiation energy applied to a particular region of the build material layer according to the actual measured temperature of the particular region, examples of the apparatus 100, and moveable carriage 150 thereof, described herein may help provide objects with good structural integrity and aesthetic appearance compared with other systems, by reducing such unwanted defects discussed above.

The radiation device 170 may comprise an array of radiation sources 170 to emit radiation onto the build material 120. The array of radiation sources 170 has a preheating mode and a fusing mode as described above. In this example, the controller 140 is to control, based on the mode of the array of radiation sources 170 and the thermal image data obtained by the thermal imaging camera 160, an amount of radiation energy applied to the region 125 of the build material 120 by the array of radiation sources 170.

In examples, each radiation source 170 in the array of radiation sources is individually addressable, e.g. by the controller 140, to emit radiation at a respective given power onto a respective subregion of build material. For example, each radiation source 170 may have an adjustable current and/or voltage supply to variably control the power output of the radiation source 170. The controller 140 may modulate the adjustable current and/or voltage supply to each radiation source 170 and thus in turn control a local energy density applied to the build material 120 surface in each respective sub-region. This may allow a higher accuracy, e.g. increased resolution, of the spatial distribution of energy density applied to the build material during preheating and/or fusing thereof as part of the build process.

A sub-region may be a division of a given region 125 of the build material 120. For example, the given region 125 may be divided into a number of sub-regions, with each radiation source corresponding to its own respective sub-region of build material 120. In this way, each radiation source 170 in the array may emit radiation substantially toward its own sub-region rather than sub-regions covered by other radiation sources 170 in the array. However, in some examples, each radiation source 170 in the array may also emit, to a lesser extent, some radiation which influences an adjacent sub-region corresponding to another radiation source 170 in the array.

In examples, the thermal sensor device 160 may comprise an array of thermal sensors 160, The thermal sensors 160 may be thermal imaging cameras, for example. Each thermal imaging camera 160 in the array may obtain thermal image data associated with a respective sub-region of the build material 120. As described above, a sub-region may be a division of a given region 125 of the build material 120. For example, each thermal imaging camera 160 may correspond to its own respective sub-region of build material 120 when the carriage 150 is positioned over a given region 125 of the build material 120. In this way, each thermal imaging camera 160 in the array may image its own sub-region rather than sub-regions covered by other thermal imaging camera 160 in the array. However, in some examples, each thermal imaging camera 160 in the array may also image a lesser part of an adjacent sub-region corresponding to another thermal imaging camera 160 in the array.

In some examples, the moveable carriage 150 includes an array of radiation sources 170 and an array of thermal imaging cameras 160. Each thermal imaging camera 160 in the array of thermal imaging cameras 160 may correspond with a respective radiation source in the array of radiation sources 170. For example, there may be the same number of radiation sources 170 and thermal imaging cameras 160 in their respective arrays. In such examples, the controller 140 may control an amount of radiation power emitted by each radiation source 170 based on the mode of the array of radiation sources and the thermal image data obtained by each corresponding thermal imaging camera 160.

In other examples, there may be a different number of radiation sources 170 and thermal imaging cameras 160 in their respective arrays. For example, a respective thermal imaging camera 160 in the array of thermal imaging cameras 160 may correspond with a respective plurality of radiation sources 170 in the array of radiation sources. In such cases, the controller 140 may control an amount of radiation power emitted by each of the plurality of radiation sources 170 based on the mode of the array of radiation sources and the thermal image data obtained by the thermal imaging camera 160 corresponding to the plurality of radiation sources 170.

In the example of FIG. 1b, the carriage 150 is also equipped with a distribution element 190 to distribute build material 120 in the working area 110. The distribution element 190, or "distributor", may provide a layer of build material 120 in the working area 110, e.g. on the build platform 115. Examples of suitable distributors 190 include a wiper blade, a roller, and combinations thereof. In some examples, the distributor 190 may comprise a supply bed and fabrication piston to push the build material 120 onto the build platform 115. Build material 120 can be supplied to the distributor 190 from a hopper or other suitable substrate supply mechanism 105, as previously described. In the example apparatus 100 shown in FIG. 1b, the distributor 190 may move, as part of the carriage 150, along the x-axis direction of the build platform 115 to provide a layer of the build material 120.

The carriage 150 in the example of FIG. 1b also includes a printing agent deposit mechanism 180 to selectively deliver printing agent to one or more portions of the build material 120. The printing agent may be a composition to modify a degree of fusing of the one or more portions of build material 120 upon application of radiation thereto. For example, the printing agent may be a fusing agent or a detailing agent, as previously described. In some examples, the carriage 150 includes multiple printing agent deposit mechanisms 180, each to selectively deliver a respective printing agent, e.g. a fusing agent or a detailing agent. In other examples; the printing agent deposit mechanism 180 may be a component separate to the moveable carriage 150. For example, in FIG. 1a, the carriage 150 having the radiation source 170 and thermal imaging camera 160 does not also include a printing agent deposit mechanism 180. In some cases, the printing agent deposit mechanism 180 may be on a different moveable carriage of the apparatus 100.

The printing agent deposit mechanism 180 may be a printhead, such as a thermal printhead or a piezo inkjet printhead where the ejection mechanism is based on thermal or piezoelectric elements, respectively. In some examples, the printhead may be a drop-on-demand printhead. In other examples, the printhead may be continuous-drop printhead. The printhead may include one or more nozzles, e.g. an array of nozzles, configured to deposit the printing agent(s) onto the build material 120. In one example, printheads such as those used in commercially available inkjet printers may be used. In other examples, the printing agent(s) may be delivered through spray nozzles rather than through printheads. Other delivery mechanisms may be used as well.

The printing agent deposit mechanism 180 may be used to selectively deliver, e.g., deposit, printing agent when in the form of a suitable fluid, such as liquid. In some examples, the printing agent deposit mechanism 180 may be selected to deliver drops of agent at a resolution of between 300 to 1200 dots per inch (DPI), e.g. 600 DPI. In other examples, the printing agent deposit mechanism 180 may be selected to be able to deliver drops of agent at a higher or lower resolution. In some examples, the printing agent deposit mechanism 180 may have an array of nozzles through which the printing agent deposit mechanism 180 is able to selectively eject drops of fluid. In some examples, each drop may be in the order of about 10 picoliters (pl) per drop, although in other examples the printing agent deposit mechanism 180 is able to deliver a higher or lower drop size. In some examples the printing agent deposit mechanism 180 is able to deliver variable size drops.

Performing the application of radiation during the preheating and fusing stages by the same radiation device 170, as in the present apparatus 100, may positively affect the printing agent deposit mechanism 180 compared to systems using a static array of shortwave IR emitters above the build zone for the preheating stage. For example, in such latter systems, the array of shortwave IR emitters above the build zone can also irradiate system components arranged below the array, e.g. a printing station featuring a printing agent deposit mechanism for the deposition of printing agent(s). This additional heating of the printing station can negatively impact the functioning of the printing agent deposit mechanism, e.g. printing heads, and may shorten the lifespan of the printing station, and/or other, components.

Furthermore, arranging more of the printer components, e.g. the consolidated radiation device 170 and the thermal sensor device 160, and optionally one or more of the printing agent deposit mechanism 180 and the distribution element 190, on the carriage 150 of the apparatus 100 may reduce a volume of the working area 110, e.g. printing chamber. In certain examples, the working area 110 during a print job may comprise an atmosphere where oxygen is at least partly replaced, e.g. by a vacuum or an inert gas, to reduce oxidation effects on the printing agent(s) and/or build material 120 during the print job. Thus, the apparatus 100 may include components (not shown) to pump oxygen out of the working area 110 and/or pump the inert gas in. Reducing the volume of the working area 110, as described, may therefore allow for a lower inert gas and/or power consumption, and inert conditions in the working area 110 may be achieved sooner, e.g. in a shorter time prior to beginning the print job.

In any of the described examples, the controller 140 may control application of the printing agent(s) to the build material 120 using the printing agent deposit mechanism(s) 180. For example, the controller 140 may control the printing agent deposit mechanism(s) 180 by sending control signals thereto, e.g. via a communication path 145.

Figure 2A:
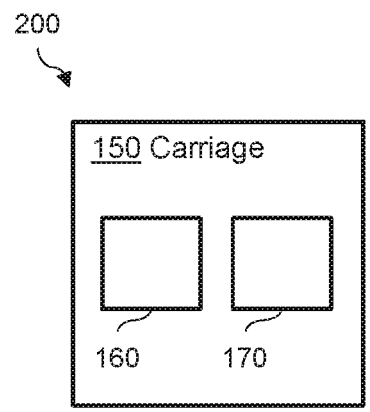
FIGS. 2a and 2b are schematic diagrams of a carriage assembly for an additive manufacturing system, according to examples.
Figure 2B:
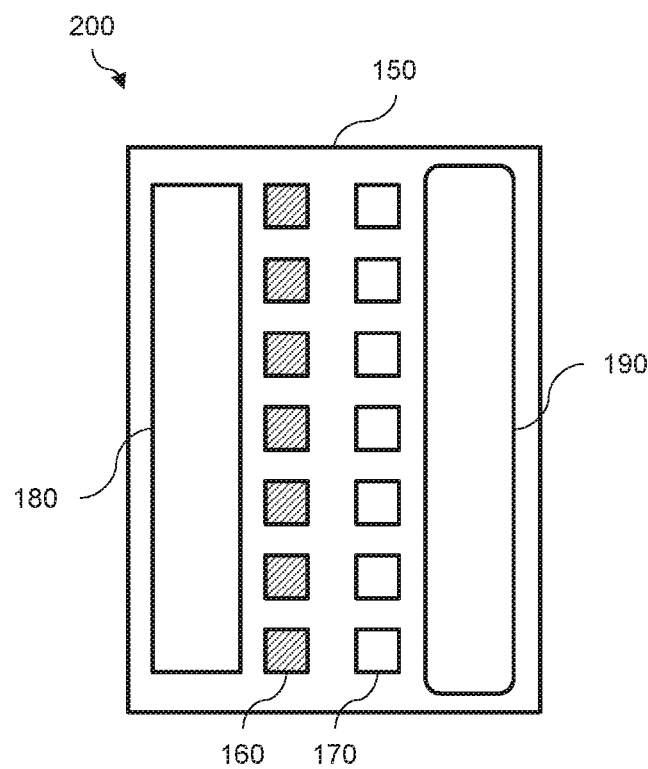

FIGS. 2*a* and 2*b* each show a schematic plan view of a respective example of a carriage assembly 200. The carriage assembly 200 may be implemented in an additive manufacturing system, for example the additive manufacturing apparatus 100 as previously described in examples. Components of the carriage assembly 200 of FIGS. 2*a* and 2*b* that are similar to, or the same as, corresponding features of the carriage 150 of FIGS. 1*a* and 1*b* are labelled with the same reference numerals; corresponding descriptions should be taken to apply.

The carriage assembly 200 includes a moveable carriage 150 having thereon a thermal sensor device 160 and a radiation device 170. The movable carriage 150 is to move over a build zone of the additive manufacturing system, e.g. the working area 110 of the apparatus 100, as previously described.

The thermal sensor device 160 on the carriage 150 is to obtain thermal data associated with a region of build material in the build zone, e.g. the region 125 shown in FIGS. 1*a* and 1*b*. For example, the thermal sensor device 160 may comprise a thermographic camera to obtain thermal image data associated with the region of build material.

The radiation device 170 on the carriage 150 is to apply radiation onto the build material, and is configurable between a preheating mode and a fusing mode. In the preheating mode, the radiation device 170 is to apply radiation onto the region of build material to raise a surface temperature thereof. As the movable carriage 150 is to move over the build zone, the radiation device 170 may apply radiation to a plurality of regions of build material, e.g. a whole layer of build material, in the preheating mode. As such, the layer of build material may be preheated to below the melting or fusing temperature of the build material. In the fusing mode, the radiation device 170 is to apply radiation onto the region of build material to selectively fuse at least part of the region of build material. The at least part of the region of build material to be selectively fused by the radiation device 170 may have a fusing agent deposited thereon prior to application of radiation onto the region of build material by the radiation device 170 in the fusing mode. For example, the at least part of the region of build material may comprise one or more portions of build material defined by a pattern of one or more printing agents prior to applying radiation, from the radiation device 170 in the fusing mode, to the region of build material.

In examples, the radiation device 170 is to apply the radiation at a given energy onto the build material. The given energy may be based on: whether the radiation device is configured in the preheating mode or the fusing mode; and the thermal data obtained by the thermal sensor device 160. Thus, the thermal data associated with a region of build material, as obtained by the thermal sensor device 160, is used to control the amount of energy applied by the radiation device 170 to the region of build material, thereby taking into account the temperature of the region of build material. This system may thus more accurately apply energy in proportion to a temperature of a build material region, and without more expensive or complex thermal measuring devices, compared to other systems.

In another example, a determination of the given energy to be applied to the region of build material may involve determining thermal data, e.g. a temperature value, associate with the region of build material, and comparing the determined temperature value with a lookup database of predetermined energy values, the predetermined energy values corresponding to an amount of energy to be applied to a build material region of a determined temperature. That is, the lookup database may contain data as to how much energy should be applied to a working area region based on the temperature of build material in the corresponding region.

The given amount of energy to be applied may correspond with a particular irradiance value, e.g. a radiant flux (power) incident on the build material surface per unit area, which may be expressed in units of watts per square meter (W/m 2). The amount of energy to be applied may thus be represented as a combination of the irradiance value and a given amount of time the radiation is to be applied for. In examples, the amount of energy may additionally or alternatively may be represented as a configuration of the radiation device that provides such a particular irradiance value, e.g. in terms of an applied power level, and a particular time period during which the radiation is to be applied to the region of build material.

In examples, the radiation device 170 includes a linear array of radiation sources 170 on the carriage 150, as shown in the example of FIG. 2b. The linear array of radiation sources 170 may be configurable between the preheating mode and the fusing mode. In some examples, each radiation source 170, or sub-array of radiation sources 170, in the array is configurable between the preheating mode and the fusing mode.

A linear array of radiation sources 170 may be considered an arrangement of the radiation sources 170 in a line (or "row", or "column"), e.g. a one-dimensional array. For example, FIG. 2b shows a linear array of seven radiation sources 170 arranged in a line on the carriage 150.

In examples, each radiation source 170 of the linear array of radiation sources is to apply radiation at a respective given energy onto a respective sub-region of build material. For example, the array of radiation sources 170, as shown in FIG. 2b, may collectively cover a region of build material. Each of the seven radiation sources 170 in the array may heat one of seven different sub-regions of the build material, where the seven sub-regions collectively cover the entire region of build material.

Implementing the radiation sources 170 as a linear array that is traversable over the build material, e.g. in a linear array arrangement on the moveable carriage 150, may enable a reduction in the total number of radiation sources 170 for a same or higher resolution, e.g. spatial distribution, of radiation sources 170 as a system implementing a static 2D array of radiation sources.

Each radiation source 170 in the linear array of radiation sources may be individually addressable to emit radiation at a respective given power onto a respective sub-region of build material for a predetermined time period. The predetermined time period may correspond to whether the array of radiation sources is configured in the preheating or fusing mode. For example, each radiation source 170 may have an adjustable current and/or voltage supply to variably control the power output of the radiation source 170.

In other examples, each radiation source 170 in the linear array of radiation sources may be individually addressable to emit radiation, at a predetermined power, onto a respective sub-region of build material for a respective given time period corresponding to the respective given amount of energy. The predetermined power output of each radiation source 170 may correspond to whether the array of radiation sources is configured in the preheating or fusing mode. Various combinations of such approaches are possible.

The respective given energy for each radiation source 170 of the linear array of radiation sources may be based on whether the linear array of radiation sources is configured in the preheating mode or the fusing mode. For example, when the linear array of radiation sources is configured in the preheating mode, a predetermined time period or predetermined power output for the application of radiation onto a respective sub-region of build material by the respective radiation source may be set, e.g. by a controller. When the linear array of radiation sources is configured in the fusing mode, a different predetermined time period or predetermined power output may be set for the respective radiation source.

In some examples, a first amount of power is applied to the linear array of radiation sources 170 in the preheating mode to preheat a region of build material, e.g. prior to depositing a fusing agent on the build material. A second amount of power may be applied to the array to subsequently heat the deposited fusing agent. The second amount of power may be higher than the first amount of power. Applying different powers to the array of radiation sources 170 enables the region of build material to be preheated to a first temperature, e.g. below the melting point of the build material, and the at least part of the region with fusing agent deposited thereon to be heated to a second, higher temperature, above the melting point of the build material. Applying different powers may involve, for example, driving the array with different currents and using a constant potential difference, varying the potential difference and maintaining a constant current, or varying both the applied current and the potential difference.

The respective given energy for each radiation source 170 of the linear array of radiation sources may also be based on the thermal data obtained by the thermal sensor device 160, as described above. The thermal data may for example comprise a one- or two-dimensional representation of the temperature of the upper surface of the region of build material imaged by the thermal sensor device 160 as a function of position, for example expressed as a temperature T (e.g. in Celsius) at associated Cartesian x-y coordinates (e.g. in micrometers). This representation may comprise an array or an "image" of the upper surface of the build material, wherein values within the array or pixels within the image are representative of the measured temperature. In other examples, the thermal data may comprise a relative measurement, e.g. a difference in temperature between two areas and/or a difference between a measured temperature and a desired minimum temperature.

In some examples, the respective given amount of energy applied to a respective sub-region of build material by the respective radiation source 170 may be in proportion to a difference between a predefined threshold temperature and the temperature for the corresponding sub-region represented in the thermal data obtained for the region. For example, the thermal data may indicate a given sub-region of build material, with given x-y coordinates, to have a temperature that is a certain amount below the predefined threshold. The respective radiation source 170 may then apply energy, to the sub-region, of an amount in proportion to that certain amount. The predefined threshold temperature may correspond to the mode of the array of radiation sources 170, e.g. whether the array of radiation sources 170 is in the preheating mode or the fusing mode. For example, a first predefined threshold temperature, which is below the fusing or melting temperature of the build material, may be set when the array of radiation sources 170 is in the preheating mode. Similarly, a second predefined threshold temperature, which is above the fusing or melting temperature of the build material, may be set when the array of radiation sources 170 is in the fusing mode, for example.

In some examples, the carriage assembly 200 includes a linear array of thermal sensors 160 on the carriage 150, as shown in the example of FIG. 2b. Each thermal sensor 160 in the linear array of thermal sensors 160 may obtain thermal data associated with a respective sub-region of build material, e.g. in the build zone of an additive manufacturing system. For example, the linear array of thermal sensors 160, as shown in FIG. 2b, may collectively cover a region of build material. The linear array of thermal sensors 160 may comprise a given number of thermal sensors 160. Each of the given number of thermal sensors 160 in the array may obtain thermal data associated with one of the given number of different sub-regions of build material, where the given number of sub-regions collectively cover the entire region of build material.

Implementing the thermal sensors 160 in a linear array arrangement on the moveable carriage 150 may enable a reduction in the resolution of each thermal sensor 160, compared to systems implementing an overhead thermal sensor further from the build material, for a same or higher overall spatial resolution of the thermal data obtained radiation sources 170.

In some examples, each thermal sensor 160 in the linear array of thermal sensors 160 corresponds with a respective radiation source 170 in the linear array of radiation sources 170. In such examples, a respective thermal sensor 160 may obtain thermal data associated with a given sub-region of build material, and the corresponding radiation source 170 may apply radiation onto the given sub-region of build material at a given energy based on the thermal data associated therewith. The given energy applied by the radiation source 170 may also be based on whether the linear array of radiation sources 170 is configured in the preheating mode or the fusing mode, as described above.

The given amount of energy applied to a given sub-region of build material by the radiation source 170 corresponding to the given sub-region may be in proportion to a difference between a predefined threshold temperature and the temperature for the corresponding sub-region represented in the thermal data obtained for the sub-region, e.g. by the thermal sensor 160 corresponding to the sub-region. The predefined threshold temperature may correspond to the mode of the array of radiation sources 170, e.g. whether the array of radiation sources 170 is in the preheating mode or the fusing mode, as described above.

In some examples, the carriage assembly 200 includes a distribution element 190 on the carriage 150 to distribute build material, e.g. in the build zone of the additive manufacturing system. The distribution element 190 may distribute, or "spread", the build material to form a layer thereof, e.g. on a build platform in the build area. Examples of suitable distributors 190 include a wiper blade, a roller, and combinations thereof, as previously described. The distribution element 190 may be moveable, e.g. pivotable, with respect to the carriage 150. For example, returning to FIG. 1b, which shows a carriage 150 with a distribution element 190 as previously described, the distribution element 190 may be moveable to lower it toward the build platform 115 in the −z axis direction, and to raise it away from the build platform 115 in the +z axis direction. Thus, the distribution element 190 may be lowered to distribute build material 120 as the carriage 150 is moved over the build zone, or working area 110, and subsequently raised when the build material 120 is formed as a layer for preheating.

In examples, the carriage assembly 200 includes a printing agent deposit mechanism 180 on the carriage 150 to selectively deliver printing agent to the build material. For example, the printing agent deposit mechanism 180 may selectively deliver printing agent to the at least part of the region of build material that is to be selectively fused by the radiation source(s) 170. The printing agent may be a fusing agent or a detailing agent as previously described, e.g. a composition to modify a degree of fusing of the at least part of the region of build material upon application of radiation to the region of build material.

In examples, the carriage 150 may distribute build material as a layer in the build zone, e.g. with the distribution element 190 lowered, while the radiation source 170 or array thereof preheats regions of the layer of build material as the carriage 150 is moved over the build zone. This is described further in the example methods below.

Figure 3:
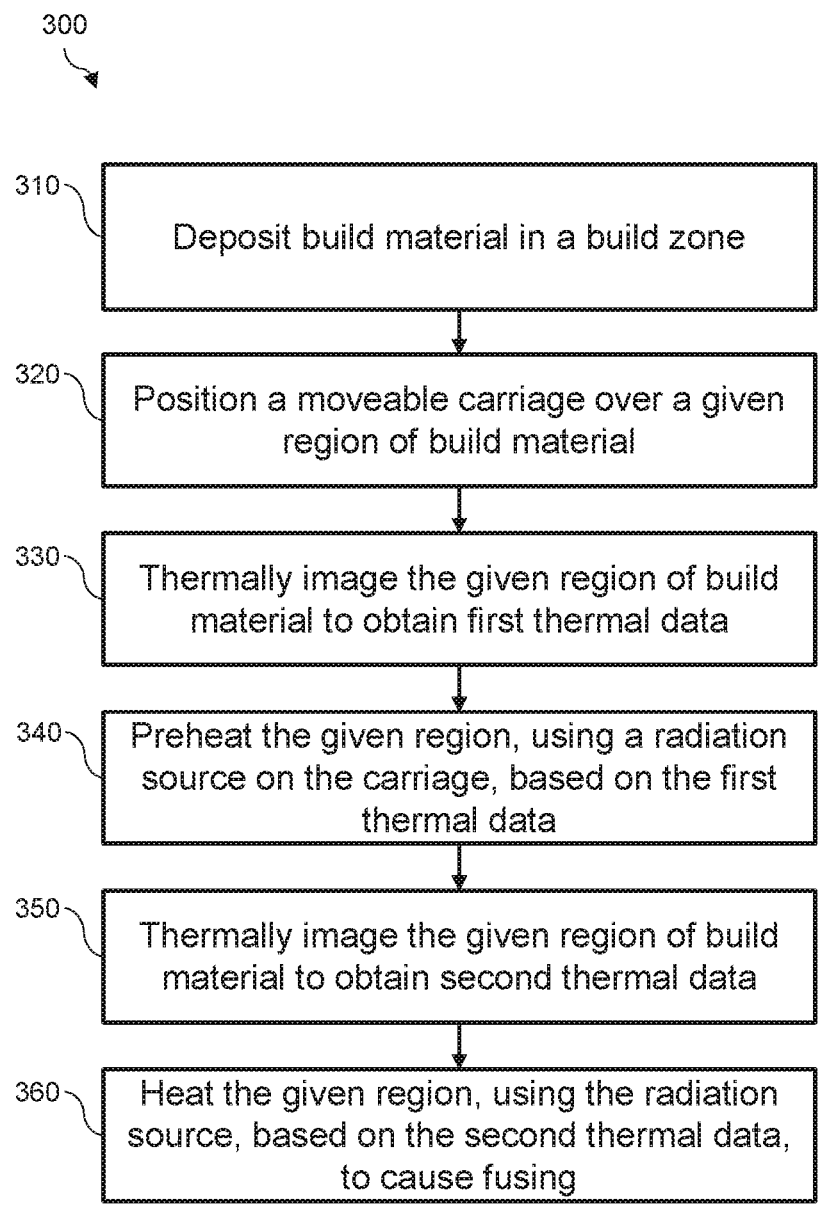
FIG. 3 is a flow chart illustrating a method of fabricating a three-dimensional object according to an example.

FIG. 3 is a flowchart showing a method 300 of fabricating a three-dimensional object according to an example. In this example, the method 300 includes depositing build material in a build zone, e.g. of an additive manufacturing system. For example, build material may be deposited on a build platform in the build zone, or upon a previously layer of build material. One or more distributors, e.g. rollers or brushes, may be supplied to evenly distribute the build material over the working area.

At block 320, a moveable carriage is positioned over a given region of the deposited build material. In examples the moveable carriage may be moved over the build material via control signals communicated from a controller, e.g. as part of the additive manufacturing system. The control signals may be generated based on build instructions, e.g. as previously described. In such examples, the moveable carriage may be positioned above the given region of build material per the build instructions and generated control signals.

At block 330, the given region of build material is thermally imaged, using a thermal imaging camera on the moveable carriage, to obtain first thermal data associated with the given region of build material. As previously described, the first thermal data may comprise a 1D or 2D representation of the temperature of the upper surface of the given region of build material imaged by the thermal imaging camera as a function of position. This representation may comprise an array or an image of the upper surface of the build material, wherein values within the array or pixels within the image are representative of the measured temperature. In other examples, the first thermal data may comprise a relative measurement, e.g. a difference in temperature between two areas of the upper surface of build material and/or a difference between a measured temperature and a predefined temperature. In examples, the thermal imaging camera may comprise another type of thermal sensor device 160, e.g. according to an example previously described.

At block 340, the given region of build material is preheated, using a radiation source on the carriage, to below a predetermined temperature. The predetermined temperature may correspond to a fusing or melting temperature of the build material. The predetermined temperature may therefore be dependent on the build material used. The radiation source may comprise a radiation device 170 according to an example previously described. An amount of radiation energy applied to the given region of build material by the radiation source is determined based on the first thermal data. For example, the amount of radiation energy to be applied by the radiation source during preheating may correspond to a differential between the obtained first thermal data, e.g. temperature value, and predefined thermal data, e.g. a predefined temperature value below the predetermined temperature. The predefined thermal data may correspond to the stage of the manufacturing process, e.g. to the preheating stage.

At block 350, the given region of build material is thermally imaged, using the thermal imaging camera, to obtain second thermal data associated therewith. For example, the moveable carriage may move over the build zone between block 350, e.g. to preheat one or more other regions of build material in the build zone using the radiation source. The moveable carriage may therefore return to the given region later on in the manufacturing process to reimage the given region using the thermal sensor to obtain the second thermal data. The second thermal data may be of the same type as the first thermal data, e.g. a thermal image or a temperature measurement of the given region, but obtained after preheating of the given region by the radiation source at block 340 of the method 300.

At block 360, the given region of build material is heated, using the radiation source, to above the predetermined temperature. This heating is to cause fusing of at least part of the given region of build material. The amount of radiation energy applied to the given region of build material by the radiation source is determined based on the second thermal data.

In some examples, before heating the given region of build material, the method 300 involves selectively depositing printing agent, using a printing agent deposit mechanism on the moveable carriage, to the at least part of the given region that is to be fused when the given region of build material is heated at block 360. For example, the printing agent may be a composition to modify a degree of fusing of the at least part of the given region of build material upon application of radiation thereto. In examples, the printing agent is a fusing agent as previously described.

In examples, the method 300 involves scanning the moveable carriage over the build zone in a first scan, which includes positioning the moveable carriage over a plurality of regions of build material including the given region described above. In some examples, blocks 310 to 340 (depositing the build material, the thermally imaging to obtain the first thermal data, and the preheating the given region) are performed in the first scan. Referring to FIG. 1b, the carriage 150 may move in the +x direction during the first scan, with the distributor 190 lowered towards the build platform 115 to distribute the build material 120, and the radiation source 170 in the preheating mode to preheat the given region 125 of build material).

The method 300 may further involve scanning the moveable carriage over the build zone in a second scan, including repositioning the moveable carriage over the given region. In some examples, blocks 350 and 360 (thermally imaging to obtain the second thermal data, the selectively depositing printing agent, and the heating the given region to cause fusing of the at least part of the given region) are performed in the second scan. Referring again to FIG. 1b, the carriage 150 may move in the −x direction during the second scan, with the distributor 190 raised towards the carriage 150, and the radiation source 170 in the fusing mode to heat the given region 125 of build material).

Therefore, the additive manufacturing process may be performed in two passes of the carriage over the build zone when the carriage includes thereon a build material distributor, a printing agent deposit mechanism, a thermal sensor and a radiation source having a preheating mode and a fusing mode.

In further examples, referring back to FIGS. 1a and 1b, a three-dimensional (3D) printing system 100 includes a build material deposit mechanism 105, a moveable carriage 150 having thereon a thermal imaging camera 160 and a radiation source 170, and a controller 140. The build material deposit mechanism 105 is to deposit build material 120 in a build zone 110 of the 3D printing system 100 (e.g. block 310 of the previously described method 300).

The controller 140 may cause the moveable carriage 140 to move over a given region 125 of build material (e.g. block 320). The controller 140 may also cause the thermal imaging camera 160 to thermally image the given region 125 of build material and obtain first thermal data associated therewith (e.g. block 330).

The controller 140 may further cause the radiation source 170 to preheat the given region 125 of build material to below a predetermined temperature (e.g. block 340). An amount of radiation energy applied to the given region 125 of build material by the radiation source 170 may be determined based on the first thermal data, as described in previous examples.

The controller 140 may cause the thermal imaging camera 160 to thermally image the given region 125 of build material and obtain second thermal data associated therewith (e.g. block 350). The controller 140 may then cause the radiation source 170 to heat the given region 125 of build material to above the predetermined temperature, to cause fusing of at least part of the given region 125 of build material (e.g. block 360). The amount of radiation energy applied to the given region 125 of build material by the radiation source 170 may be determined based on the second thermal data, as previously described in examples.

The controller 140 may cause the components of the 3D printing system 100, e.g. the moveable carriage 150 and components thereon, to operate as described in the above examples by sending control signals thereto. For example, the controller 140 may send specific control signals to each component via a respective communication path 145.

In examples, the controller 140 may send control signals to scan the moveable carriage 140 over the build zone 110 in a first scan. During the first scan, the controller 140 may cause the thermal imaging camera 160 to thermally image the given region 125 of build material, to obtain the first thermal data, and cause the radiation source 170 to preheat the given region 125 of build material, as described above. In some examples, the moveable carriage 140 includes a distribution element 190, as shown in FIG. 1b. In such cases, the controller 140 may cause the distribution element 190 to distribute build material 120 in the build zone 110 during the first scan. For example, the controller may send control signals to move the distribution element 190, e.g. to lower it, such that as the carriage 140 moves the distribution element 190 spreads build material 120 beneath it to form a layer of build material 120 in the build zone 110.

The controller 140 may send further control signals to scan the moveable carriage 150 over the build zone 110 in a second scan, including repositioning the moveable carriage over the given region 125. During the second scan, the controller 140 may cause the thermal imaging camera 160 to thermally image the given region 125 of build material, to obtain the second thermal data. Also during the second scan, the controller 140 may send control signals to a printing agent deposit mechanism 180, e.g. on the moveable carriage 150, to selectively deposit printing agent to at least part of the given region 125. The printing agent may be a composition to modify a degree of fusing of the at least part of the given region 125 of build material upon application of radiation thereto. For example, the printing agent may be a fusing or detailing agent. The controller 140 may further cause, during the second scan, the radiation source 170 to heat the given region 125 of build material to above the predetermined temperature, to cause fusing of the at least part of the given region 125 of build material, as described above,

What is claimed is:

1. A carriage assembly for an additive manufacturing system, the carriage assembly comprising:
   a movable carriage to move over a build zone of the additive manufacturing system;
   a thermal imaging camera sensor device on the movable carriage to obtain thermal data associated with a region of build material in the build zone; a printing agent deposit mechanism on the movable carriage to selectively deliver printing agent in the form of drops at a resolution between 300 and 1200 dots per inch (DPI) to the at least part of the region of build material;
   a single radiation device on the movable carriage to apply radiation to at least the region of build material; and
   a controller connected to the single radiation device that receives build instructions generated based on object design data and the thermal image data and processed to generate slices of parallel planes of the 3D object, wherein the controller, based on the build instructions, causes the movable carriage to move relative to the at least part of the region of build material and sets the single radiation device to be switched between at least two modes, and to be set in only one of the at least two modes at any given time in the at least two modes comprised of:
      a preheating mode to apply radiation onto the region of build material to raise a surface temperature thereof to a temperature below a fusing or melting temperature of the build material as determined by the controller; and
      a fusing mode to apply radiation onto the region of build material to selectively fuse at least part of the region of build material by irradiating the printing agent;
      wherein the controller controls an amount of radiation applied by the single radiation device based on the thermal data and which of the at least two modes is used to prevent under-heating and over-heating the build material.

2. The carriage assembly of claim 1, wherein the radiation device is to apply the radiation at a given energy onto the build material, wherein the given energy is based on whether the radiation device is configured in the preheating mode or the fusing mode and the thermal data obtained by the thermal imaging camera sensor device.

3. The carriage assembly of claim 1, wherein the radiation device comprises a linear array of radiation sources on the carriage assembly, wherein the linear array of radiation sources is configurable between the preheating mode and the fusing mode.

4. The carriage assembly of claim 3, wherein each radiation source of the linear array of radiation sources is to apply radiation at a respective given energy onto a respective sub-region of build material, wherein the respective given energy is based on whether the linear array of radiation sources is configured in the preheating mode or the fusing mode and the thermal data obtained by the thermal imaging camera sensor device.

5. The carriage assembly of claim 3, wherein the thermal imaging camera sensor device comprises a linear array of thermal imaging camera sensors, wherein each thermal imaging camera sensor of the linear array of thermal sensors is to obtain the thermal data associated with a respective sub-region of build material in the build zone.

6. The carriage assembly of claim 5, wherein each thermal imaging camera sensor of the linear array of thermal imaging camera sensors corresponds with a respective radiation source of the linear array of radiation sources, wherein each radiation source is to apply radiation onto the corresponding sub-region of the build material at a given energy based on whether the linear array of radiation sources is configured in the preheating mode or the fusing mode and the thermal data obtained by the corresponding thermal imaging camera sensor.

7. The carriage assembly of claim 1, wherein the carriage assembly comprises a distribution element on the movable carriage to distribute the build material in the build zone.

8. An apparatus for generating a three-dimensional object, the apparatus comprising:
   moveable carriage to move over a working area containing build material, the carriage including thereon:
      thermal sensor device to obtain thermal image data associated with a region of the build material;
      a printing agent deposit mechanism to selectively deliver printing agent to the at least part of the region of build material, wherein the printing agent is a composition to modify a degree of fusing of the at least part of the region of build material upon application of radiation to the region of build material;
      an array of radiation sources to emit radiation onto the build material, and selectively operable in either a preheating mode or a fusing mode, wherein the preheating mode is to raise a temperature of the build material to below a fusing or melting temperature of the build material; and
   a controller to:
      receive build instructions;
      position the movable carriage relative to the working area and set the mode of the array of radiation sources based on the build instructions;
      set the array of radiation sources to be switched between at least two modes, the at least two modes comprising the preheating mode and the fusing mode, and the array of radiation sources to be set in only one of the at least two modes at any given time;
      receive the thermal image data from the thermal sensor device; and
      control, based on the mode of the array of radiation sources and the thermal image data, an amount of radiation energy applied to the region of the build material by the array of radiation sources including controlling the array of radiation sources to fuse build material by irradiating the printing agent.

9. The apparatus of claim 8, wherein each radiation source of the array of radiation sources is individually addressable to emit radiation at a respective given power onto a respective sub-region of build material.

10. The apparatus of claim 9, wherein the thermal sensor device comprises an array of thermal imaging cameras, wherein each thermal imaging camera is to obtain thermal image data associated with a respective sub-region of the build material.

11. The apparatus of claim 10, wherein each thermal imaging camera corresponds with a respective radiation source of the array of radiation sources,
    wherein the controller is to control an amount of radiation power emitted by each radiation source based on the mode of the array of radiation sources and the thermal image data obtained by each corresponding thermal imaging camera.

12. A method of fabricating a three-dimensional object, the method comprising:

depositing build material in a build zone;

positioning a moveable carriage over a given region of build material;

thermally imaging, using a thermal imaging camera on the moveable carriage, the given region of build material to obtain first thermal data associated therewith;

preheating, using a single radiation source on the moveable carriage in a preheating mode, the given region of build material to below a fusing or melting temperature of the build material, wherein an amount of radiation energy applied to the given region of build material by the single radiation source is determined based on the first thermal data;

thermally imaging, using the thermal imaging camera, the given region of build material to obtain second thermal data associated therewith;

selectively depositing printing agent, using a printing agent deposit mechanism on the moveable carriage, to the at least part of the given region, wherein the printing agent is a composition to modify a degree of fusing of the at least part of the given region of build material upon application of radiation thereto; and heating, using the single radiation source in a fusing mode, the given region of build material to above the fusing or melting temperature, to cause fusing of at least part of the given region of build material by irradiating the printing agent, wherein the amount of radiation energy applied to the given region of build material by the single radiation source is determined based on the second thermal data, wherein the single radiation source is switched between the preheating mode and the fusing mode, and the single radiation source is set in only one of the preheating mode or the fusing mode at any given time.

13. The carriage assembly of claim 1, wherein the thermal imaging camera sensor device comprises a thermal imaging camera.

14. The carriage assembly of claim 1, wherein the thermal imaging camera sensor device comprises an array of thermal imaging cameras, wherein each thermal imaging camera is to obtain thermal image data associated with a respective sub-region of the build material.

15. The carriage assembly of claim 1, wherein the thermal sensor device comprises an array of thermal imaging cameras, wherein each thermal imaging camera is to obtain thermal image data associated with a respective sub-region of the build material.

16. The carriage assembly of claim 1, wherein the carriage assembly further comprises a printing agent that is selectively deposited to the build material by the printing agent deposit mechanism.

17. The carriage assembly of claim 1, wherein the radiation device is a non-laser radiation source.

* * * * *